US011639019B2

(12) United States Patent
Esswein et al.

(10) Patent No.: US 11,639,019 B2
(45) Date of Patent: May 2, 2023

(54) FIN BLOCK FOR A CALIBRATING DEVICE

(71) Applicant: KRAUSSMAFFEI TECHNOLOGIES GMBH, Munich (DE)

(72) Inventors: Michael Esswein, Fahrenzhausen (DE); Aron Altmann, Munich (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 0 days.

(21) Appl. No.: 17/428,500

(22) PCT Filed: Nov. 26, 2019

(86) PCT No.: PCT/EP2019/082512
§ 371 (c)(1),
(2) Date: Aug. 4, 2021

(87) PCT Pub. No.: WO2020/187435
PCT Pub. Date: Sep. 24, 2020

(65) Prior Publication Data
US 2022/0024104 A1     Jan. 27, 2022

(30) Foreign Application Priority Data
Mar. 21, 2019    (DE) .................... 10 2019 002 018.9

(51) Int. Cl.
*B29C 48/90*     (2019.01)
*B33Y 50/00*     (2015.01)
(Continued)

(52) U.S. Cl.
CPC ............ *B29C 48/907* (2019.02); *B22F 10/31* (2021.01); *B29C 48/901* (2019.02);
(Continued)

(58) Field of Classification Search
CPC .......... B22F 10/20; B22F 12/41; B22F 10/30; B22F 10/80; B22F 12/90; B23K 15/002;
(Continued)

(56) References Cited

U.S. PATENT DOCUMENTS 6,200,119 B1    3/2001  Pelto et al.
2003/0211657 A1  11/2003 Williams et al.
(Continued)

FOREIGN PATENT DOCUMENTS

DE       198 43 340 C2    11/2001
DE     102005002820 B3     5/2006
(Continued)

OTHER PUBLICATIONS

International Search Report for PCT/EP2019/082512 dated Feb. 24, 2020 and translation thereof.
(Continued)

*Primary Examiner* — Monica A Huson
*Assistant Examiner* — Kelsey C Grace
(74) *Attorney, Agent, or Firm* — Pearne & Gordon LLP

(57) ABSTRACT

A fin block is provided for a calibrating device for the calibrating of an extruded plastic profile, wherein the fin block includes a back structure and a fin structure having a plurality of fins. The fins are spaced apart from one another and arranged on the back structure in longitudinal direction (L) of the back structure. The back structure of the fin block has a plurality of apertures, the shape and/or arrangement of which within the back structure depends on a predetermined mechanical load capacity for the back structure. Furthermore, a method for the production of the above-mentioned fin block and a calibrating device, which includes a plurality of the above-mentioned fin blocks, is provided. Furthermore, a system for the additive manufacture of the above-
(Continued)

mentioned fin block, a corresponding computer program and a corresponding data set is provided.

10 Claims, 5 Drawing Sheets

(51) Int. Cl.
*B33Y 80/00* (2015.01)
*B29C 64/386* (2017.01)
*B22F 10/31* (2021.01)
*B22F 10/80* (2021.01)
*B22F 10/28* (2021.01)
*B22F 12/53* (2021.01)

(52) U.S. Cl.
CPC .......... *B29C 48/908* (2019.02); *B29C 64/386* (2017.08); *B33Y 50/00* (2014.12); *B33Y 80/00* (2014.12); *B22F 10/28* (2021.01); *B22F 10/80* (2021.01); *B22F 12/53* (2021.01)

(58) Field of Classification Search
CPC ................ B23K 31/12; B23K 15/0026; B23K 15/0086; B23K 15/0013; H01J 37/3045; H01J 37/305; H01J 37/3005; H01J 37/244; H01J 2237/3045; H01J 2237/30472; H01J 2237/3128; H01J 2237/30444; H01J 2237/2445; B33Y 50/02; B33Y 40/00; B33Y 50/00; Y02P 10/25

See application file for complete search history.

(56) References Cited

U.S. PATENT DOCUMENTS

| | | |
|---|---|---|
| 2006/0034965 A1 | 2/2006 | Ulrich et al. |
| 2006/0071372 A1* | 4/2006 | Stieglitz ................ B29C 48/903 425/71 |
| 2006/0159796 A1 | 7/2006 | Schmuhl et al. |
| 2006/0185183 A1 | 8/2006 | Stieglitz et al. |
| 2018/0058473 A1* | 3/2018 | Kenworthy ............... F28F 3/04 |
| 2018/0361502 A1 | 12/2018 | Roerig et al. |

FOREIGN PATENT DOCUMENTS

| | | |
|---|---|---|
| DE | 102009016100 A1 | 10/2010 |
| EP | 2085207 A2 | 8/2009 |
| WO | 2004103684 A1 | 12/2004 |
| WO | 2005016629 A1 | 2/2005 |

OTHER PUBLICATIONS

Written Opinion for PCT/EP2019/082512 dated Feb. 24, 2020.
Powder Metallurgy Review, "Additive Manufacturing with metal powders: Design for Manufacture evolves into Design for Function", 2014, pp. 41-51.
Article "Additive Fertigun" in Technologieland Hessen and the translation thereof, Aug. 31, 2018, https://www.technologieland-hessen.de/mm/ Additive_Fertigung_Aufl2_2018_web.pdf [retrieved on Feb. 17, 2020], translation of pp. 35, 66-69.

\* cited by examiner

FIN BLOCK FOR A CALIBRATING DEVICE

CROSS-REFERENCE TO RELATED APPLICATIONS

This is a National Stage application of PCT international application PCT/EP2019/082512 filed on Nov. 26, 2019, which claims the priority of German Patent Application No. 10 2019 002 018.9, filed Mar. 21, 2019, which are incorporated herein by reference in their entireties.

FIELD OF THE INVENTION

The invention relates to a fin block for a calibrating device for calibrating an extruded profile. The invention further relates to a method for the production of such a fin block, a system for the additive manufacture of such a fin block and a corresponding computer program and data set.

BACKGROUND OF THE INVENTION

Calibrating devices are used for the calibration of extruded endless profiles, such as for example tube profiles. In the production of such profiles, firstly a desired plastic melt for the production of the profile is produced in an extruder. The produced plastic melt is then pressed through an outlet nozzle of the extruder, which prescribes the shape of the profile. The profile exiting from the outlet nozzle of the extruder then passes through a calibrating device, which post-forms the still heated profile with dimensional accuracy.

Such a calibrating device for the dimensioning of extruded profiles is known from DE 198 43 340 C2. There, a variably adjustable calibrating device is taught, which is configured for the calibration of extruded plastic tubes with different tube diameter. The calibrating device comprises a housing and a plurality of fin blocks, arranged in a circular shape in the housing, which together form a calibration basket with a circular calibration opening, through which the tubes which are to be calibrated are directed (cf. in particular FIGS. 1 and 2 of DE 198 43 340 C2). Furthermore, each fin block is coupled with an actuating device which is provided for the individual radial displacement of the respective fin block. In this way, the effective cross-section of the circular calibration opening, formed by the plurality of fin blocks, can be adjusted accordingly, as required.

The fin blocks described in DE 198 43 340 C2 consist respectively of a plurality of fins which are strung on two carrier rods arranged spaced apart from one another. To maintain a desired distance between adjacent fins, spacer sleeves are used (cf. also FIG. 3 of DE 198 43 340 C2). An example of a strung fin block is shown further in FIG. 1. The fin block 10 illustrated in FIG. 1 comprises a plurality of fins 12 and spacer sleeves 14, which are strung alternately along two carrier rods 16. Such strung fin blocks are laborious to manufacture and are thereby cost-intensive.

Differing from the strung fin blocks described above, in addition fin blocks with closed carrier structures (or respectively back structures) are known. FIG. 2 shows an example of such a fin block. The fin block 20 comprises a plurality of fins 22, which are carried by a back structure 24 which is formed in a block-shaped manner. The block-shaped back structure 24 is realized here in the form of a solid body (e.g. rod-shaped body). Further examples of fin blocks with closed back structure are known from WO 2004/103684 A1.

An advantage of fin blocks with closed back structure consists in that these can be produced simply and at a favourable cost. For example, the fin block 20 formed in one piece, illustrated in FIG. 2, can be produced by suitable processing methods (such as for example milling, cutting to size) from one material block. However, the use of a casting method is also conceivable in order to produce the fin block 20. A further advantage is the high mechanical load capacity of the solid back structure. However, it is disadvantageous that the fin blocks are relatively heavy, owing to their solid back structure. Accordingly also the overall weight of a calibrating device which is equipped with such fin blocks is relatively high. Furthermore, it is disadvantageous that the closed back structures are impenetrable for water. When, in operation of the calibrating device, the calibration head rotates with the fin blocks, an unfavourable splashing behaviour of the fin blocks can result during dipping into a cooling water sump of the calibration basket. Furthermore, the solidly formed back structure body is difficult to cool.

To improve the splashing behaviour and the cooling, it was furthermore suggested to provide the back structure bodies, which are formed in a closed manner, with bores. Such a fin block design is illustrated in FIG. 3. FIG. 3 shows a sectional view of a fin block 30, which has a fin structure with a plurality of fins 32 and a back structure 34 carrying the fins 32. The back structure 34 is perforated with circular bores 36. The bores 36 are arranged distributed uniformly over the back structure 34 and have the same diameter. Water can flow through the bores 36, whereby such fin blocks have a reduced splashing behaviour on dipping into the cooling water sump. In addition, the water flowing through the bores 36 can cool the back structure 34 from the interior. So as not to weaken the mechanical characteristics (in particular the rigidity) of the back structure 34 too greatly, the number of bores 36 in the back structure 34 is limited, however. Furthermore, the bore cross-sections are configured to be small compared to the cross-section of the back structure 34. Thereby, the problems of splashing and of cooling discussed in connection with a closed back structure can also only be solved partially or at least not optimally with this design.

BRIEF SUMMARY OF THE INVENTION

It is therefore an object of the present invention to provide fin blocks for a calibrating device which further reduce or respectively eliminate the problems indicated in connection with the prior art. Furthermore, it is an object of the present invention to provide fin blocks which are favourably priced to produce and, with a low dead weight, have as great a mechanical stability as possible. It is also an object of the present invention to indicate a production method which enables a quick and favourably priced production of the fin blocks according to the invention.

To solve the above-mentioned problem, a fin block is provided for a calibrating device for calibrating an extruded plastic profile, wherein the fin block comprises a back structure and a fin structure having a plurality of fins, wherein the fins are spaced apart from one another and are arranged on the back structure in the longitudinal direction of the back structure. The back structure has several apertures, the shape and/or arrangement of which within the back structure depends on a predetermined mechanical load capacity for the back structure.

The back structure can have a predetermined profile in cross-section to the longitudinal direction. The cross-section profile of the back structure can be selected according to the predetermined mechanical load capacity for the back structure. According to a variant, the cross-section profile of the back structure can be formed so as to be T-shaped. According to an alternative variant, the cross-section profile of the carrier structure can also be formed so as to be I-shaped.

Mechanical load capacity can mean the mechanical rigidity (bending rigidity, shear rigidity and/or torsional rigidity) of the back structure. In other words, the mechanical load capacity can be described via the rigidity parameter. Depending on the use and construction of the calibrating device, the fin block can be exposed to different mechanical stresses. Accordingly, the back structure of the fin block can be configured by selection of a suitable cross-section profile and/or of apertures, in such a way that the back structure has a rigidity which withstands the occurring mechanical stresses.

The apertures can be formed substantially running transversely to the longitudinal direction in the back structure. Furthermore, the shape and/or the arrangement of the apertures can vary along the back structure (therefore along the longitudinal direction of the back structure). In other words, the apertures formed along the back structure can have opening cross-sections, the shape and/or size of which vary with respect to one another. For example, along the back structure, portions can occur with anticipated low mechanical stress, which are then provided with one or more apertures with a large cross-section opening. Furthermore, regions with anticipated high mechanical stress can occur, which are then provided with one or more apertures with a smaller cross-section opening. Equally, the number of apertures and their arrangement with respect to one another can vary depending on the mechanical stresses which are to be expected along the back structure. The shape and/or arrangement of the apertures along the back structure is therefore not homogeneous, but rather is adapted according to the mechanical stresses which are to be expected (calculated).

According to a variant, the apertures can be configured in their cross-sectional shape and arranged along the back structure in such a way that the back structure, with a fulfilling of a predetermined mechanical load capacity, has an optimized dead weight. In other words, the apertures can be configured in such a way that the carrier structure (and therefore the fin block) has a minimum weight for achieving a predetermined mechanical load capacity.

The back structure can be formed in one piece with the fins or respectively with the fin structure. To achieve a one-piece formation, the fin block can be produced by means of 3D printing. However, it is also conceivable that the fin block is manufactured for example by milling, drilling and/or cutting from a single workpiece. Alternatively, the fin structure or respectively the fins and the back structure can be manufactured separately respectively. The fin structure or respectively fins can then be connected with the back structure accordingly.

The back structure and the fins can be made from the same material or from different materials. According to a variant, the material from which the back structure and/or the fins are made can be made from a metallic material. However, the use of a polymer material (with additives) is also conceivable.

According to a further aspect of the invention, a calibrating device is provided for the calibrating of extruded plastic profiles, wherein the calibrating device has a plurality of the fin blocks according to the invention, which are arranged with respect to one another for the formation of a calibration opening. The arrangement of the fin blocks here can be such that these form a circular calibration opening.

The calibrating device can further comprise a plurality of actuating devices, wherein each of the plurality of actuating devices is coupled with a fin block of the plurality of fin blocks. Through the actuating device, each fin block can be actuated individually radially to the calibration opening. Thereby, the effective cross-section of the calibration opening can be adapted, as required, to the cross-section (diameter) of the profile which is to be calibrated.

Furthermore, the calibrating device can have a housing which is provided for receiving and storing the actuating device and the fin blocks which are coupled with the actuating device.

According to a further aspect of the present invention, a method is provided for producing a fin block as described above. The method for producing the fin block comprises at least the step of producing the fin block by means of 3D printing or by means of additive manufacture. The production of the fin block by means of 3D printing method or additive manufacture can comprise here a layer by layer laser sintering/laser melting of layers of material, wherein the layers of material are applied in succession (sequentially) according to the form of the fin block which is to be produced.

The method can further comprise the step of calculating a fin block geometry (CAD data) and, optionally, the converting of the 3D geometry data into corresponding control commands for the 3D printing or the additive manufacture method.

In particular, the step of calculating a 3D geometry can comprise the step of calculating an optimized carrier structure which adapts the shape and arrangement of the openings to the anticipated local mechanical stresses of the carrier structure (or respectively of the fin block). In this way, a back structure can be produced which is reduced in weight, without weakening the mechanical load of the fin block.

According to a further aspect, a method is provided for producing a fin block which comprises the steps: establishing a data set which represents the fin block as described above; and storing the data set on a storage device or a server. The method can further comprise: inputting the data set into a processing device or a computer, which actuates a device for additive manufacture in such a way that it manufactures the fin block represented in the data set.

According to a further aspect, a system is provided for the additive manufacture of a fin block, with a data set generating device for generating a data set, which represents the fin block as described above, a storage device for storing the data set, and a processing device for receiving the data set and for actuating a device for additive manufacture in such a way that it manufactures the fin block represented in the data set. The storage device can be a USB stick, a CD-ROM, a DVD, a memory card or a hard disk. The processing device can be a computer, a server or a processor.

According to a further aspect, a computer program or respectively a computer program product is provided, comprising data sets which with the reading of the data sets by a processing device or a computer causes it to actuate a device for additive manufacture in such a way that the device for additive manufacture manufactures the fin block as described above.

According to a further aspect, a machine-readable data carrier is provided, on which the computer program which has been described above is stored. The machine-readable data carrier can be a USB stick, a CD-ROM, a DVD, a memory card or a hard disk.

According to a further aspect, a data set is provided, which represents the fin block as described above. The data set can be stored on a machine-readable data carrier.

BRIEF DESCRIPTION OF THE DRAWINGS

Further advantages, details and aspects of the present invention are discussed further with the aid of the following drawings. There are shown.

DESCRIPTION OF EXAMPLE EMBODIMENTS

Figure 1:
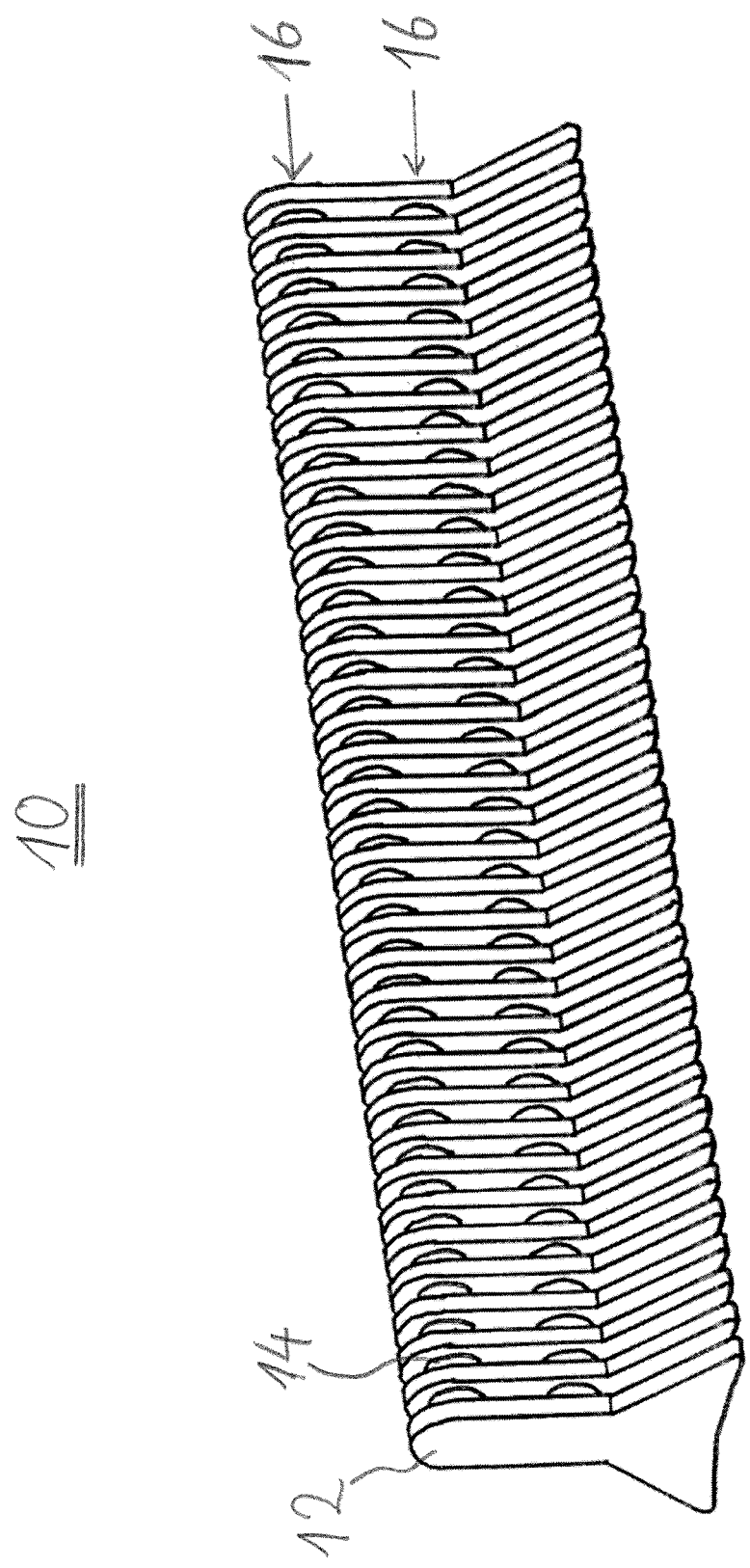
FIG. 1 a fin block for a calibrating device according to the prior art.
Figure 2:
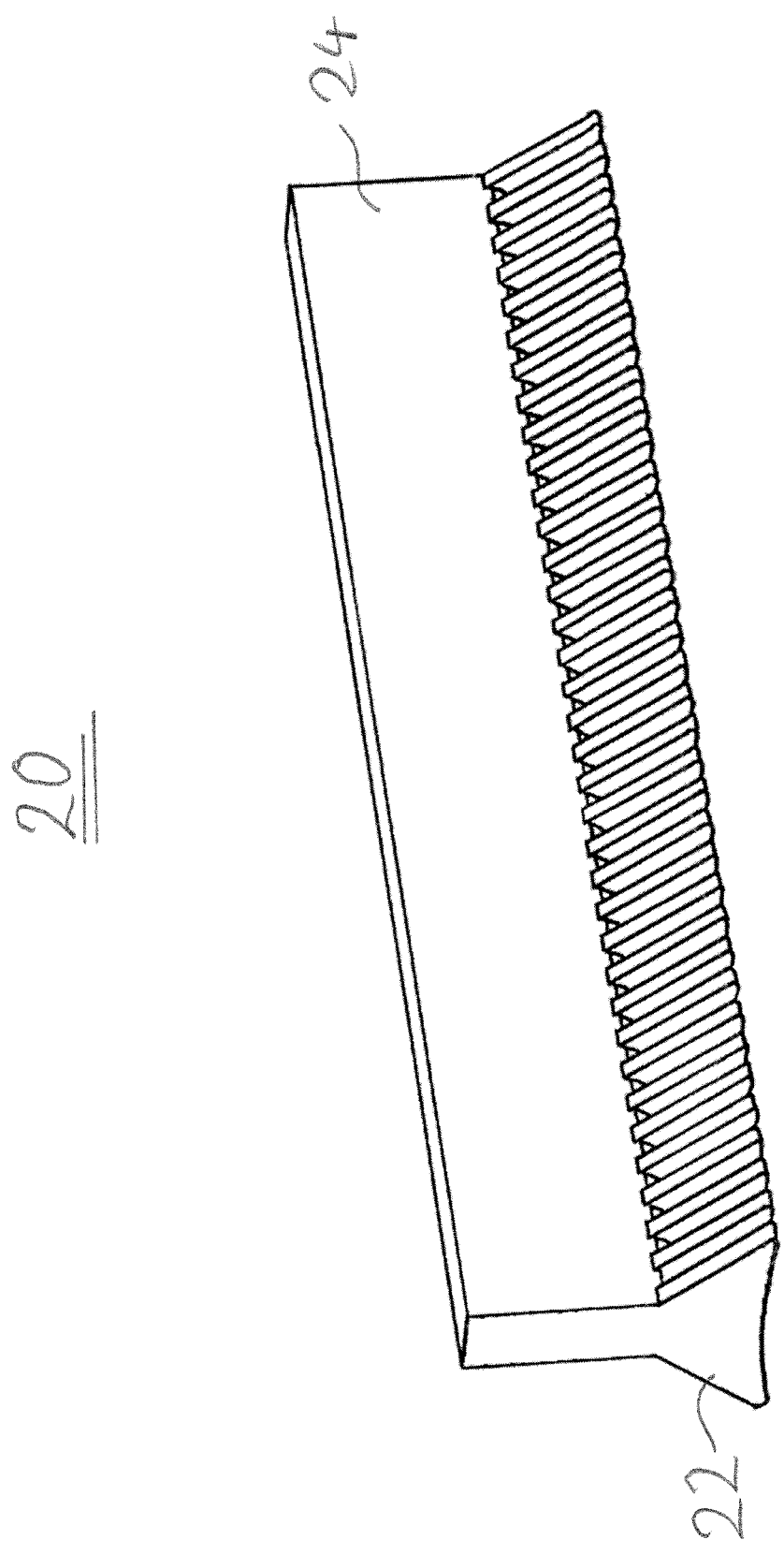
FIG. 2 a further fin block for a calibrating device according to the prior art.
Figure 3:
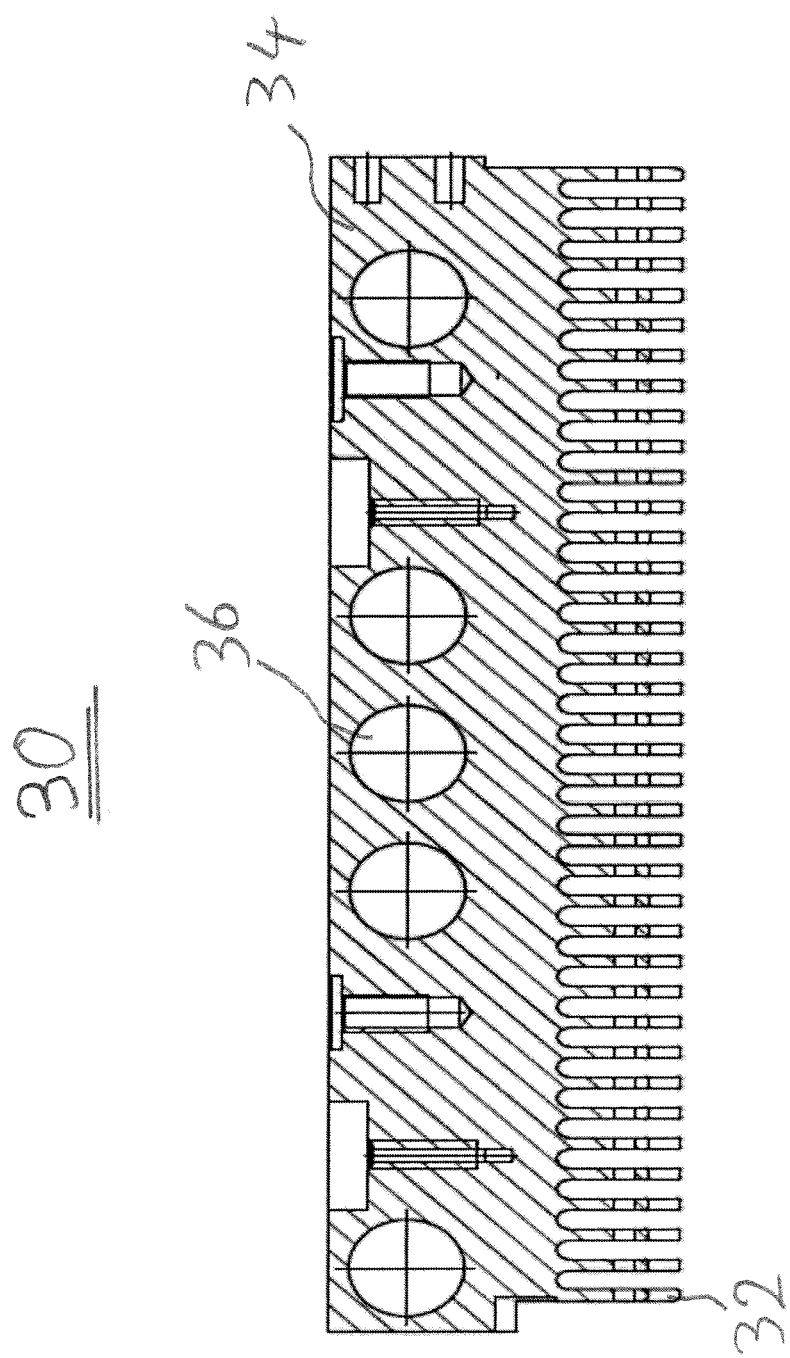
FIG. 3 a sectional view of a further fin block according to the prior art.

FIGS. 1 to 3 were already discussed in the introduction in connection with the prior art. Reference is to be made to the description there.

Figure 4:
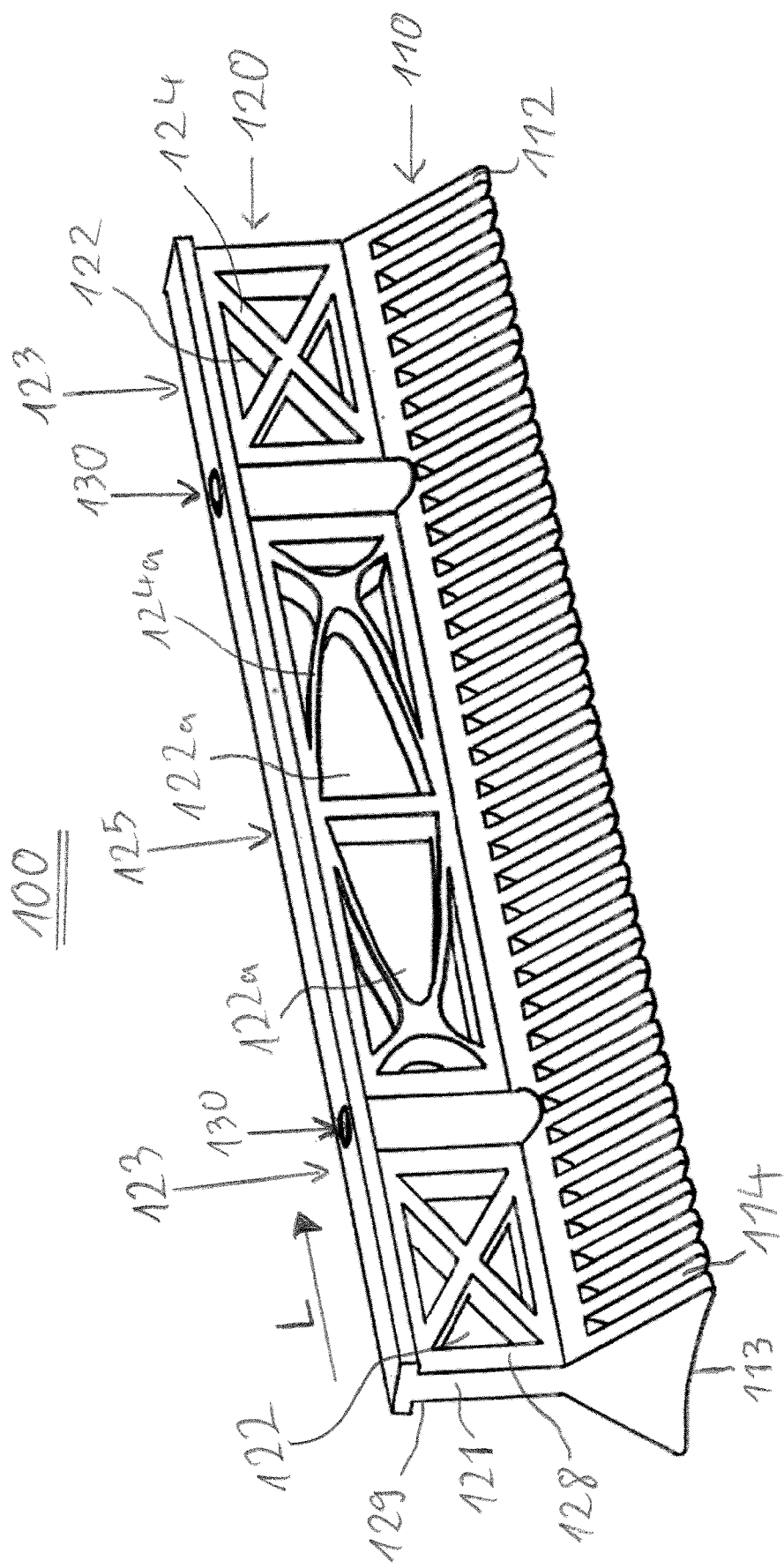
FIG. 4 an example of a fin block according to the invention.

In connection with FIG. 4, an example of a fin block 100 according to the invention for a calibrating device is now described further.

The fin block 100 comprises a back structure 120 and a fin structure 110, which has a plurality of fins 112. The back structure 120 functions as a carrier for the fin structure 110.

The fin block 100 can have, furthermore, a coupling device 130 which is provided for coupling with an actuating device of a calibrating device. The actuating device can not be seen in FIG. 4. According to the implementation shown in FIG. 4, the coupling device comprises two threaded bores 130, arranged spaced apart from one another. The threaded bores 130 can be formed in an integrated manner in the back structure 120.

The fin structure 110 comprises a plurality of fins 112, which are arranged spaced apart from one another in longitudinal direction L of the fin block 100. Adjacent fins 112 are separated from one another by corresponding grooves 114. In the embodiment illustrated in FIG. 4, each fin 112 has a profile which is triangular in cross-section to the longitudinal direction L. The fin side 113 facing away from the back structure 120 is configured so as to be slightly curved. The fin side 113 faces the profile which is to be calibrated. It forms the contact side with the profile which is to be calibrated. Depending on the application, the fin block 100 can also have a different fin shape which can differ from the triangular cross-section profile described here. Likewise, the fin side 113 facing the profile which is to be calibrated can be flat or can have a different curvature.

The back structure 120 is formed as an elongated body with a predetermined cross-section profile 121 perpendicularly to the longitudinal direction L. In the embodiment shown in FIG. 4, the back structure 120 has a T profile. Other profiles, such as for example an I profile are likewise conceivable. The cross-section profile 121 of the back structure 120 can be selected accordingly depending on the load forces which are to be expected acting on the back structure 120.

Irrespective of the practical cross-section profile (T profile or I profile), a plurality of apertures 122, 122a (perforations) are formed in the back structure 120 in longitudinal direction L. These apertures 122, 122a run substantially perpendicularly to the longitudinal direction L. They connect the two lateral flanks 128, 129 of the back structure 120. A back structure 120 with a predetermined cross-section profile 121 is thus produced, which is penetrated at its lateral flanks 128, 129.

As can be seen further from FIG. 4, the design (more precisely the shape and/or the size) of the individual apertures 122, 122a varies in longitudinal direction L of the back structure 120. The two end portions 123 of the back structure 120 have, partially, apertures 122 with smaller cross-section openings than the middle portion 125 (cf. in particular the two centrally arranged apertures 122a), because this portion is exposed to fewer mechanical stresses during operation of the calibrating machine than the two opposite end portions 123 in longitudinal direction L. In addition to the size, the shape of the apertures 122, 122a (the shape of the cross-section openings of the apertures 122, 12a) can also be varied accordingly depending on the mechanical stresses acting on a portion of the back structure 120. For example, the end portions 123 of the back structure 120 are provided with triangular apertures 122, whereas the middle portion 125 has apertures 122a which differ from the triangular shape.

Generally it can be stated that according to the present invention the size and/or shape of the apertures 122, 122a are formed depending on the mechanical load forces acting on the back structure 120. In particular, the size and/or shape of the apertures 122a formed in the back structure 120 can vary along its longitudinal direction L, because during operation the fin block 100 can be exposed to different forces in longitudinal direction L.

In the embodiment illustrated in FIG. 4, the apertures 122, 122a are furthermore dimensioned and arranged in such a way that the back structure 120, in addition to a predetermined mechanical load capacity also has a reduced (minimized) dead weight. The result of such a weight optimization whilst maintaining the predetermined mechanical load capacity is a back structure 120, which owing to the apertures 122, 122a is configured substantially in a frame-shaped manner and has struts 124, 124a in the interior of the frame. The shape of the struts 124, 124a depends on the local load capacity requirements for the back structure 120 and can vary in longitudinal direction L of the back structure 120.

The (maximum) reduction, described here, of the dead weight of the back structure 120 whilst maintaining predetermined load capacity requirements can be simulated by means of a mathematical model for each fin block 100 (cf. by means of finite elements simulation). According to the simulation results and the topology of the apertures 122, 122a resulting therefrom, the back structure 120 can be produced accordingly.

Figure 5:
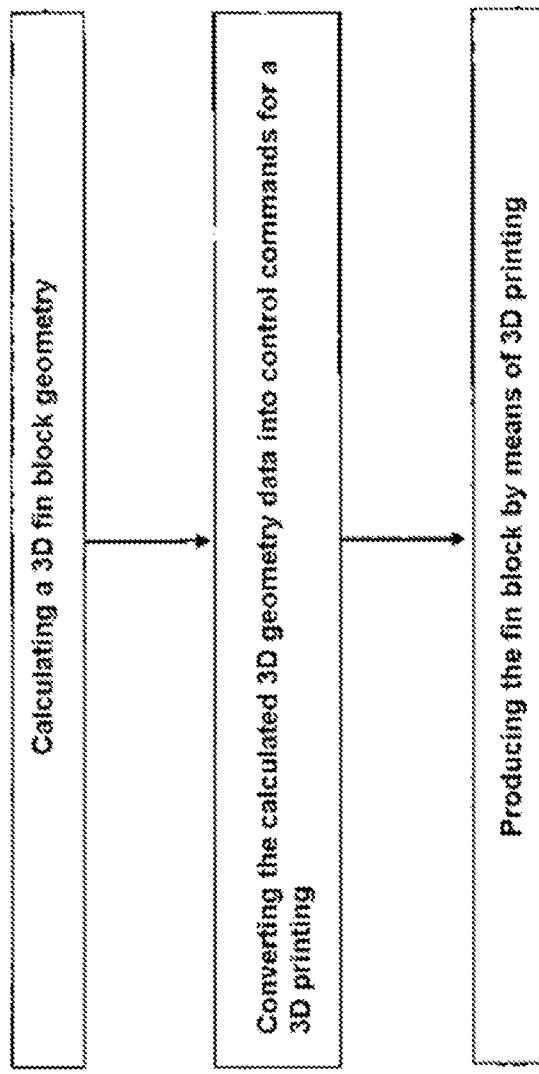
FIG. 5 a block diagram of a method for the production of the fin block according to the invention.

For the production of the back structure 120 (or respectively of the entire fin block 120) a generative or respectively additive manufacturing method can be used. Such a production method is shown in FIG. 5. Accordingly, a 3D printing method is used. Here, in a first step on the basis of the simulation described above, which simulates a suitable topology of the back structure 120, 3D geometry data (CAD data) are calculated. The 3D geometry data describe the geometry of the back structure (or respectively of the entire fin block 100). In a second step, the calculated 3D geometry data are converted into control commands for a 3D printing. Based on the generated control commands, the back structure (or the entire fin block 100) is then built up layer by layer by means of a 3D printing method (e.g. laser sintering, laser melting). A metallic material or a polymer material can be used as material for the 3D printing.

Alternatively to the production by means of 3D printing, it is also conceivable to produce the back structure 120 (or respectively the entire fin block 100) from a workpiece (for example by milling, drilling, cutting) or by means of a casting method.

The fin block 100 shown in FIG. 4 can form, together with a plurality of further similar fin blocks 100, a calibration basket for a calibrating device. The arrangement of the plurality of fin blocks 100 for the formation of a calibration basket with predetermined calibration cross-section can take place in an analogous manner to as described in DE 198 43 340 A1.

It shall be understood that the fin block 100 shown in FIG. 4 is by way of example and other geometries are conceivable in the configuration of the fins 122 and also in the configuration of the back structure 110. It is essential for the present invention that the back structure 120 has apertures 122, 122*a*, the shape and/or arrangement of which is adapted to the anticipated occurring mechanical stresses and can vary within the back structure. The apertures 122, 122*a* are therefore not restricted only to uniform circular bores, in order to enable a penetration of water. Rather, the individual apertures 122, 122*a* are optimized in their shape and structure to the effect that the back structure 120 has substantially less material and, at the same time, has as high a mechanical load capacity as possible. Therefore, not only can the material usage be further reduced, but also the overall weight of calibrating devices into which the fin block, described above, can be installed. Furthermore, the splashing behaviour and the cooling are further improved through the design of the back structure which is described here. Furthermore, the production costs of the fin block decrease through the reduced material usage.

What is claimed is:

1. A fin block for a calibrating device for calibrating an extruded profile, the fin block comprising:
   a back structure extending between opposite first and second ends thereof in a longitudinal direction of the fin block; and
   a fin structure having a plurality of fins, wherein the plurality of fins are spaced apart from one another and arranged on the back structure in the longitudinal direction of the back structure, wherein the plurality of fins extend directly outwards from the back structure,
   wherein the back structure has opposite first and second end portions and a middle portion disposed therebetween, the first end portion being disposed adjacent the first end of the back structure and the second end portion being disposed adjacent the second end of the back structure,
   wherein each of the first and second end portions and the middle portion of the back structure has a plurality of apertures extending therethrough in a direction perpendicular to the longitudinal direction of the back structure, the shape and/or arrangement of which within the back structure depends on a predetermined mechanical load capacity for the back structure,
   wherein a cross-sectional shape and size of one aperture of the plurality of apertures extending through the first end portion are different than a cross-sectional shape and size of one aperture of the plurality of apertures extending through the middle end portion,
   wherein the apertures are configured in their cross-sectional shape and arranged along the back structure in such a way that the back structure has an optimized dead weight whilst maintaining the predetermined mechanical load capacity.

2. The fin block according to claim 1, wherein the back structure has a profile which is predetermined in cross-section to the longitudinal direction and is adapted to the predetermined mechanical load capacity.

3. The fin block according to claim 1, wherein the fin block is formed in one piece.

4. The fin block according to claim 1, wherein the back structure and the fin structure are made from the same material or from different materials.

5. The fin block according to claim 1, wherein the back structure and/or the fin structure are formed from a metallic material or from a polymer material.

6. The fin block according to claim 1, wherein the fin block is produced by means of 3D printing or respectively by means of an additive manufacturing method.

7. The fin block according to claim 1, wherein the back structure has first and second bores formed therein and spaced from one another in the longitudinal direction, wherein each of the first and second bores extends perpendicularly to the longitudinal direction and in a direction from a top wall of the back structure towards the fin structure, and wherein the middle portion of the back structure extends between said first and second bores.

8. The fin block according to claim 1, wherein a cross-sectional shape and size of one aperture of the plurality of apertures extending through the second end portion are the same as the cross-sectional shape and size of said one aperture extending through the first end portion.

9. The fin block according to claim 1, wherein the plurality of apertures extending through the first end portion of the back structure are defined by a frame defining a single cut-out in the first end portion, and a pair of intersecting struts that subdivide said single cut-out into said plurality of apertures.

10. The fin block according to claim 1, wherein the back structure has first and second bores formed therein and spaced from one another in the longitudinal direction, wherein each of the first and second bores extends perpendicularly to the longitudinal direction and in a direction from a top wall of the back structure towards the fin structure, and wherein the middle portion of the back structure extends between said first and second bores,
   wherein a cross-sectional shape and size of one aperture of the plurality of apertures extending through the second end portion are the same as the cross-sectional shape and size of said one aperture extending through the first end portion, and
   wherein the plurality of apertures extending through the first end portion of the back structure are defined by a frame defining a single cut-out in the first end portion, and a pair of intersecting struts that subdivide said single cut-out into said plurality of apertures.

* * * * *